US012429805B2

(12) United States Patent
Hidaka

(10) Patent No.: US 12,429,805 B2
(45) Date of Patent: Sep. 30, 2025

(54) IMAGE FORMING APPARATUS AND CONTROL METHOD THEREOF

(71) Applicant: CANON KABUSHIKI KAISHA, Tokyo (JP)

(72) Inventor: Keita Hidaka, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/811,200

(22) Filed: Aug. 21, 2024

(65) Prior Publication Data

US 2024/0411259 A1 Dec. 12, 2024

Related U.S. Application Data

(63) Continuation of application No. 17/703,450, filed on Mar. 24, 2022, now Pat. No. 12,092,982, which is a continuation of application No. 16/713,990, filed on Dec. 13, 2019, now Pat. No. 11,300,914.

(30) Foreign Application Priority Data

Dec. 27, 2018 (JP) ................................ 2018-246039

(51) Int. Cl.
*G03G 15/00* (2006.01)

(52) U.S. Cl.
CPC ....... *G03G 15/607* (2013.01); *G03G 15/5062* (2013.01); *G03G 15/55* (2013.01); *G03G 15/6558* (2013.01)

(58) Field of Classification Search
CPC ............... G03G 15/6558; G03G 15/55; G03G 15/5062; G03G 15/607
See application file for complete search history.

(56) References Cited

U.S. PATENT DOCUMENTS

2007/0285743 A1* 12/2007 Hirayama ............ H04N 1/6033 358/1.9
2008/0239414 A1* 10/2008 Misu .................. H04N 1/00816 358/498
2013/0293905 A1* 11/2013 Odaira ............... G03G 15/5025 358/1.9
2017/0199488 A1* 7/2017 Maeda ............... H04N 1/00039

* cited by examiner

*Primary Examiner* — David H Banh
(74) *Attorney, Agent, or Firm* — Canon U.S.A., Inc. IP Division

(57) ABSTRACT

An image forming apparatus includes an image forming unit and a reading unit. The image forming unit is configured to form an image. The reading unit has a first reading mode, in which a document conveyed by a conveyance unit is read, and a second reading mode, in which a document placed on a platen glass is read. A first correction mode, in which correction data is generated using a result of reading the test document in the first reading mode, or a second correction mode, in which correction data is generated using a result of reading the test document in the second reading mode, is executed based on a result of detection of placement of a test document on the reading unit.

12 Claims, 8 Drawing Sheets

FIG.5

| | PLATEN GLASS | ADF | OPERATION |
|---|---|---|---|
| DOCUMENT DETECTION STATE | ○ | × | READ DOCUMENT SET ON PLATEN GLASS |
| | × | ○ | READ DOCUMENT FED BY ADF |
| | ○ | ○ | DISPLAY ERROR SCREEN |
| | × | × | DISPLAY ERROR SCREEN |

IMAGE FORMING APPARATUS AND CONTROL METHOD THEREOF

CROSS-REFERENCE TO RELATED APPLICATIONS

The present application is a continuation of U.S. patent application Ser. No. 17/703,450, filed on Mar. 24, 2022, which is a continuation of U.S. patent application Ser. No. 16/713,990, filed on Dec. 13, 2019, issued as U.S. Pat. No. 11,300,914 on Apr. 12, 2022, which claims priority from Japanese Patent Application No. 2018-246039 filed Dec. 27, 2018, which are hereby incorporated by reference herein in their entireties.

BACKGROUND

Field

The present disclosure relates to calibration control in an image forming apparatus.

Description of the Related Art

When an electrophotographic image forming apparatus is continuously used, the density of an image printed on a sheet fluctuates due to various factors. Examples of factors that cause a fluctuation in image density include a deterioration level of parts of the image forming apparatus, an environment (temperature, humidity) where the image forming apparatus is placed, and consumables such as toners and sheets that are used in printing by the image forming apparatus.

Thus, calibration is executed so that the image forming apparatus prints an image with a target density. Specifically, correction data is generated using a color difference between a result of reading a test pattern acquired by printing a patch image on a medium, such as a sheet, and the target density.

Japanese Patent Application Laid-Open No. 2007-329929 discusses an image forming apparatus that efficiently generates correction data by causing a scanner to read a test pattern on a document conveyed by an automatic document conveyance apparatus (auto document feeder (hereinafter, referred to as "ADF")).

Japanese Patent Application Laid-Open No. 2002-59626 discusses an image forming apparatus that includes an ADF and generates correction data using a result of reading a test pattern on a document conveyed by the ADF. Further, an image forming apparatus that does not include an ADF and generates correction data using a result of reading a test pattern on a document placed on a platen glass is also discussed.

SUMMARY

It has now been determined that in a method of reading a document conveyed by an ADF, an operation of opening and closing a document pressing plate is unnecessary, unlike that in a method of reading a document placed on a platen glass, and thus the operation burden on a user in reading a plurality of documents continuously at once is reduced, wherein in the method of reading a document placed on a platen glass, the reading accuracy is sometimes higher than that in the method of reading a document conveyed by an ADF. In view thereof, it has now been determined that it would be desirable to include the two reading methods in a single image forming apparatus and select one of the reading methods that is suitable for an intended purpose of use by the user.

According to an aspect of the present disclosure, an image forming apparatus includes an image forming unit and a reading unit. The image forming unit is configured to form an image. The reading unit has a first reading mode, in which a document conveyed by a conveyance unit is read, and a second reading mode, in which a document placed on a platen glass is read. The image forming apparatus also includes a detection unit configured to detect placement of a test document on the reading unit, and a correction data generation unit configured to determine, based on a result of the detection by the detection unit, to execute a first correction mode, in which correction data is generated using a result of reading the test document in the first reading mode, or a second correction mode, in which correction data is generated using a result of reading the test document in the second reading mode, and generate correction data in the determined correction mode.

Further features of the present disclosure will become apparent from the following description of exemplary embodiments with reference to the attached drawings.

BRIEF DESCRIPTION OF THE DRAWINGS

FIG. 5 illustrates an operation mode determination method according to an exemplary embodiment of the present disclosure.

DESCRIPTION OF THE EMBODIMENTS

Various exemplary embodiments of the present disclosure will be described in detail below with reference to the drawings.

It should be noted that the below-described exemplary embodiments are not intended to limit the scope of the claimed invention and that not every combination of features described in the exemplary embodiments is always essential to a technical solution of the invention.

Figure 1:
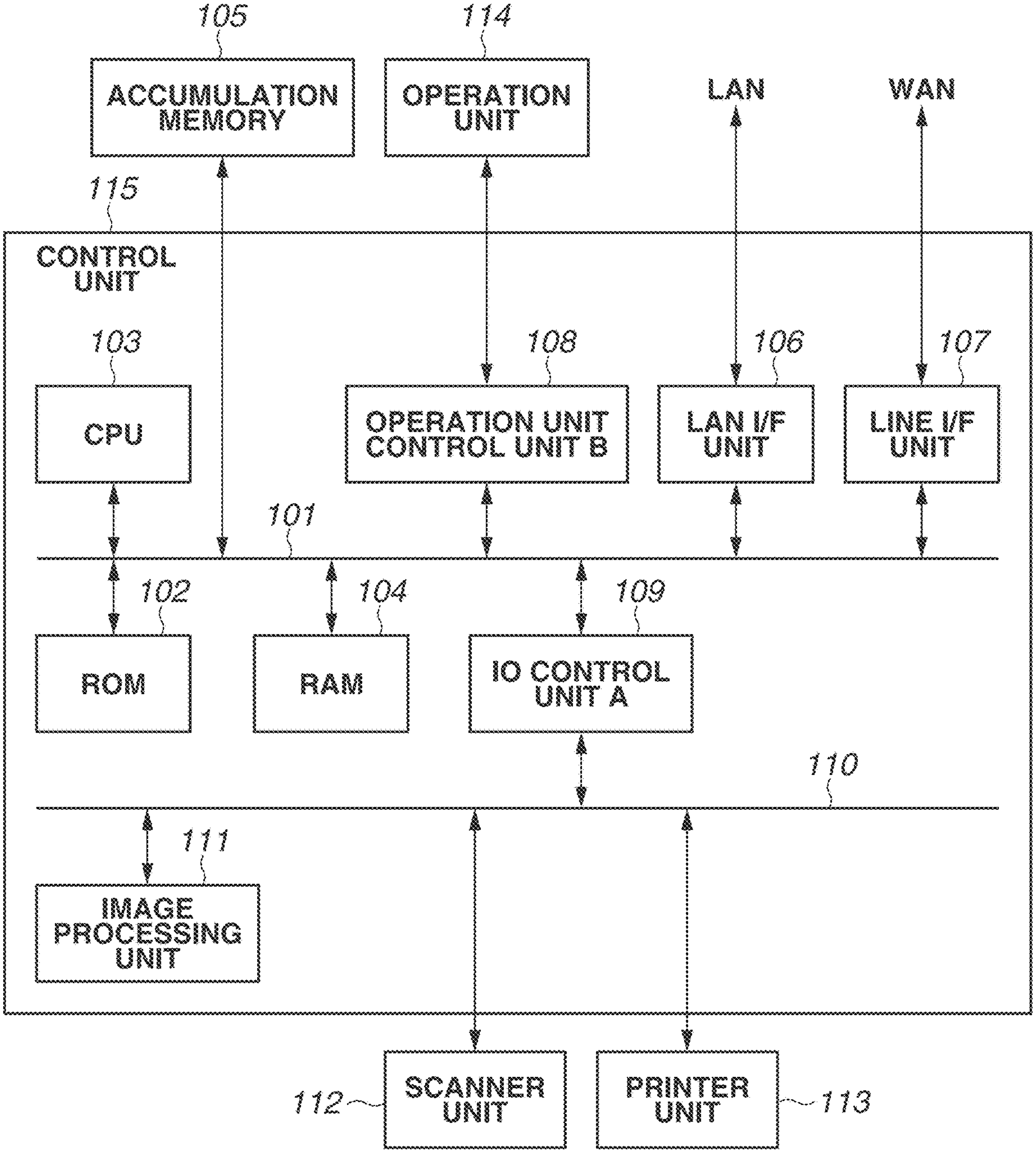
FIG. 1 is a system block diagram illustrating an image forming apparatus according to an exemplary embodiment of the present disclosure.

FIG. 1 is a block diagram illustrating a control unit 115 of an image forming apparatus according to a first exemplary embodiment. Each component of the control unit 115 is connected to a system bus 101 and/or an image bus 110. A read-only memory (ROM) 102 stores a system boot program. Further, system software configured to realize each unit according to the present exemplary embodiment is stored on the ROM 102 or an accumulation memory 105 and executed by a central processing unit (CPU) 103. A random access memory (RAM) 104 is a system work area for software execution by the CPU 103 and is also an image memory configured to temporarily store image data while the image data is processed. The accumulation memory 105 is used as an internal storage. Data read by a scanner unit 112, image data, and system software are stored. The accumulation memory 105 includes a hard disk drive (HDD) or solid state drive (SSD). A local area network (LAN) interface (I/F) unit 106 is an I/F unit configured to connect to a LAN and performs information input/output with a device connected to the LAN. A line I/F unit 107 is an I/F unit configured to connect to a wide area network (WAN) and performs information input/output with a device connected to the WAN. The above-described configurations are provided on the system bus 101. An input/output (IO) control unit A 109 is a bus bridge that connects the system bus 101 and the image bus 110, which transfers image data at high speed, and converts a data configuration for the system bus 101. The image bus 110 includes an all-purpose bus such as a Peripheral Component Interconnect (PCI) bus, Institute of Electrical and Electronics Engineers (IEEE) 1394 bus, or PCI Express (PCIEx) bus. The below-described configurations are provided on the image bus 110. The scanner unit 112 and a printer unit 113, which are image input/output devices, and an image processing unit 111 are connected, and synchronous/asynchronous conversion of image data is performed. The image processing unit 111 includes a plurality of application-specific integrated circuits (ASICs) configured to perform image processing, such as resolution conversion, compression/decompression, and binary multi-value conversion, on input image data and output image data. An operation unit control unit B 108 for image data is an interface unit between the control unit 115 and an operation unit (user interface (hereinafter, referred to as "UI")) 114 and outputs image data to be displayed on the operation unit 114 to the operation unit 114. Further, the operation unit control unit B 108 is also configured to transmit information input to the operation unit 114 by a system user to the CPU 103. The operation unit control unit B 108 is an I/F unit via which software controls the operation unit 114, which includes a display apparatus and a keypad apparatus. In the present exemplary embodiment, the operation unit 114 includes a liquid crystal display (LCD) touch panel and analyzes a video graphics array (VGA) signal output from the operation unit control unit B 108 and displays the VGA signal.

Figure 2:
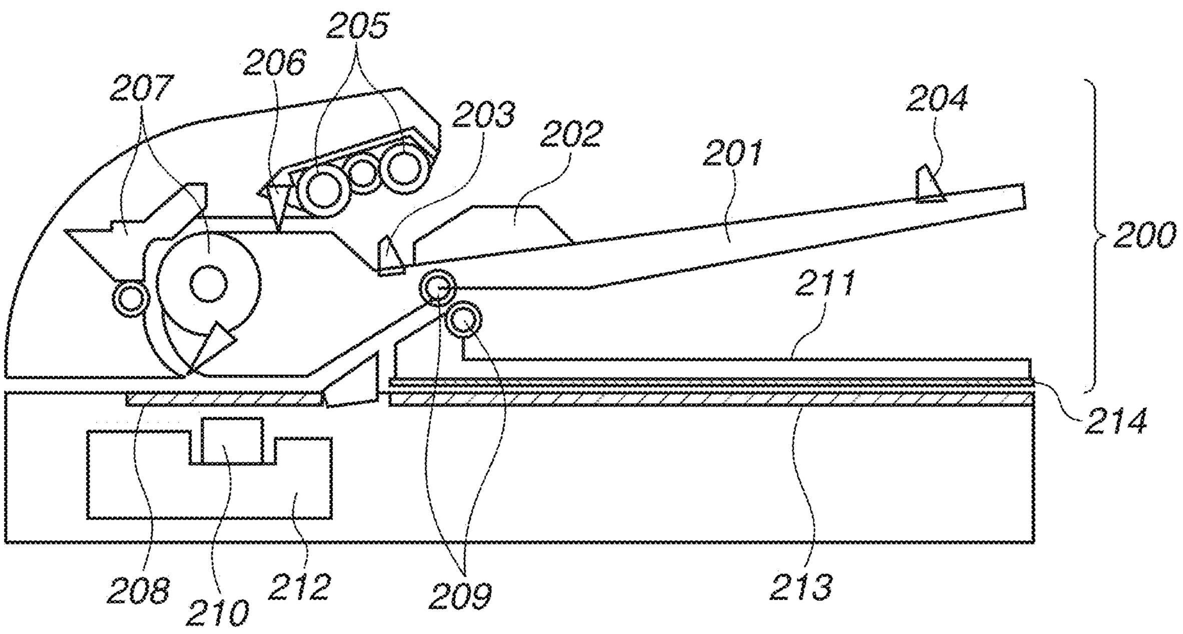
FIG. 2 illustrates a scanner unit according to an exemplary embodiment of the present disclosure.

FIG. 2 is a cross-sectional side view illustrating an internal configuration of a document feeder (DF) unit 200 of the scanner unit 112. The DF unit 200 includes a document tray 201 for stacking a document to be read. A document sensor 203, two document guides 202, and a document size detection sensor 204 are provided on the document tray 201. The document sensor 203 detects whether there is a document. If the document sensor 203 detects a document on a sheet conveyance path, the detected document is conveyed. The two document guides 202 are aligned in a lengthwise direction of the document (vertical to a document conveyance direction), and a document stacked on the document tray 201 is conveyed by three rollers, a pickup roller 205, a conveyance roller 207, and a sheet discharge roller 209. The pickup roller 205 is a roller that conveys the document stacked on the document tray 201 into the document conveyance path in the DF unit 200. The conveyance roller 207 conveys the document conveyed into the document conveyance path by the pickup roller 205. The sheet discharge roller 209 conveys the document conveyed by the conveyance roller 207 to a sheet discharge tray 211. Further, the document conveyed by the pickup roller 205 is detected by a document passing detection sensor 206, and whether the first document has passed is determined based on the time of the detection. Further, all the conveyance roller 207, the pickup roller 205, and the sheet discharge roller 209 are driven by a stepping motor (illustration thereof is omitted). Sub-scan thinning processing in the DF unit 200 is realized by setting driving pulses of the conveyance roller 207, the pickup roller 205, and the sheet discharge roller 209 to twice the frequency. The document conveyed by the DF unit 200 is read by a contact image sensor (CIS) 210 via a DF reading window 208, the CIS 210 being provided to a sensor unit 212 located under the DF reading window 208. The sensor unit 212 is freely movable in a sub-scan direction and also in a direction that is the same as the document conveyance direction in which the document is conveyed from the conveyance roller 207 toward the sheet discharge roller 209. The DF reading window 208 has a length in the sub-scan direction, and the CIS 210 can be moved to a desired position within the length range and can read the document at the moved position. The CIS 210 includes a photoelectric conversion element, such as a charge-coupled device (CCD), and simultaneously performs First In First Out (FIFO) accumulation of an image from each element and generation of a control signal for controlling the FIFO accumulation and the CCD. The CIS 210 is generally realized by a plurality of photoelectric conversion elements arranged in a line.

Further, the scanner unit 112 includes a platen glass 213. In a case where a document is to be read via the platen glass 213, it is also possible to open a document pressing plate 214, place the document on the platen glass 213, close the document pressing plate 214, and then read the document while moving the sensor unit 212 having the CIS 210 in the sub-scan direction.

Further, the CIS 210 is also configured to detect whether a document is set on the platen glass 213. When the document pressing plate 214 is closed, the CIS 210 reads a portion of the document under the platen glass 213. The CIS 210 analyzes the read image and determines whether a document is set. As this is a publicly-known technique, detailed description thereof will be omitted.

In the present exemplary embodiment, a method of reading a document placed on the document tray 201 while conveying the document in a state where the sensor unit 212 having the CIS 210 is fixed is referred to as "ADF reading mode" (first reading mode). Further, a method of reading a document placed on the platen glass 213 by moving the sensor unit 212 is referred to as "pressing-plate reading mode" (second reading mode).

Figure 3:
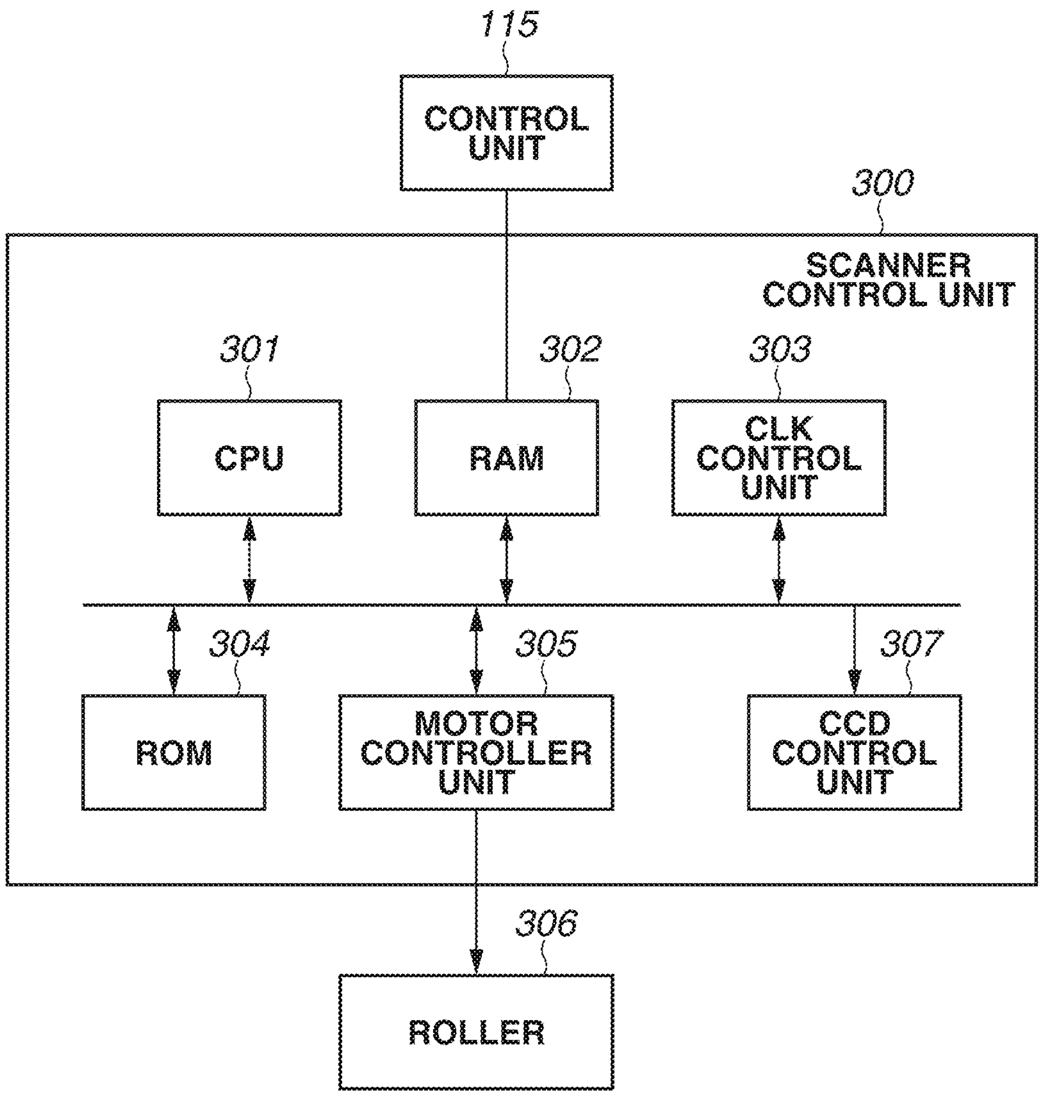
FIG. 3 is a block diagram illustrating a control unit that controls the scanner unit according to an exemplary embodiment of the present disclosure.

FIG. 3 illustrates blocks in which hardware for controlling the scanner unit 112 based on a scanner unit control application program is integrated, and the blocks are included in the scanner unit 112. The scanner unit 112 is controlled based on the scanner unit control application program that is executed on a CPU 301 of a scanner control unit 300 in the description below. Alternatively, an application program for controlling the scanner unit 112 can be executed by the CPU 103 of the control unit 115. The scanner control unit 300 includes the CPU 301, a RAM 302, a clock (CLK) control unit 303, a ROM 304, a motor controller unit 305, and a CCD control unit 307. The scanner unit control application program is stored on the ROM 304 and executed by the CPU 301. The CLK control unit 303 distributes a clock to each block. The CLK control unit 303 includes a crystal oscillator and a phase-locked loop (PLL) element. The crystal oscillator generates a clock, and the PLL element multiplies and divides the clock generated by the crystal oscillator. The scanner unit control application configured to control the scanner control unit 300 outputs a control clock from the CLK control unit 303 to the motor controller unit 305, the CCD control unit 307, and the RAM 302 according to an instruction in scanning. The blocks further perform multiplication and division according to the clock input from the CLK control unit 303 and generate a control clock for a motor that rotates the CCD element and various rollers. The instruction for scanning contains information such as color/monochrome distinction information and resolution information, and the scanner unit control application changes a setting of the PLL of the CLK control unit 303 based on the content of the instruction. By changing the setting of the PLL, frequencies of various clocks are changed to change a reading speed. Image data read by the CIS 210 is accumulated on the ROM 304.

An operation of a calibration function will be described in detail below. In the present exemplary embodiment, generation of correction data for use in image density adjustment will be described below as an example. The present exemplary embodiment, however, is not limited to the described example and is also applicable to calibration, such as image position adjustment or density non-uniformity adjustment, in which a patch image is printed on a sheet and a scanner unit reads the patch image and correction data is generated using the reading result.

Figure 4:
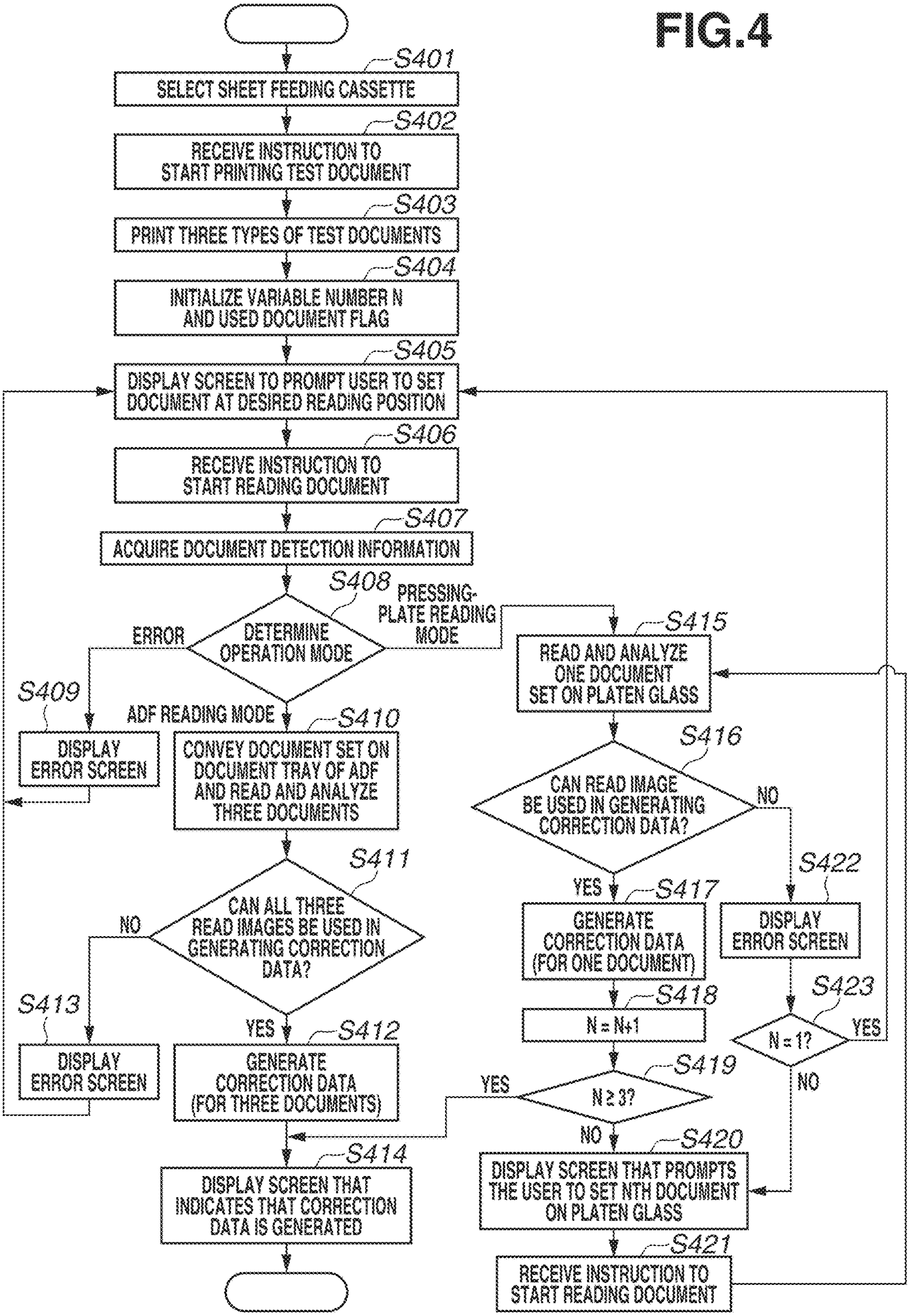
FIG. 4 is a flowchart illustrating an operation according to a first exemplary embodiment of the present disclosure.

Next, a process of generating correction data for use in density adjustment according to the present exemplary embodiment will be described below with reference to FIG. 4. In the present exemplary embodiment, a case where three documents (charts) on which a predetermined test pattern is printed are printed, the printed test documents are read, and correction data is generated using the reading result will be described.

The number of test documents needed is generally determined based on the type of a dither pattern that is used by an image forming apparatus in image forming, because correction data needs to be generated with respect to each dither pattern that is used in executing image processing. Thus, an image forming apparatus that can use a plurality of dither patterns needs to generate correction data for each of the dither patterns. The correction data is generated using a result of reading a single test document printed using a dither pattern. Thus, in a case where correction data is to be generated for three dither patterns (e.g., low lines per inch, high lines per inch, error diffusion), three test documents are needed. Further, in another exemplary embodiment, a plurality of dither patterns can be used to print on a single test document. In this case, the number of test documents needed is reduced. The number of test documents can be determined based on the number of dither patterns as described above, or the processing can be performed using a number of test documents needed to generate correction data corresponding to a selected dither pattern.

A program of the control unit 115 for the flowchart is stored on the ROM 102 of the control unit 115 and is read to the RAM 104 and executed by the CPU 103.

In step S401, a sheet feeding cassette of the printer unit 113 that stores a sheet on which a test document is to be printed is selected via the operation unit 114 based on a user instruction to execute calibration.

Next, in step S402, an instruction to execute printing is received via the operation unit 114. In step S403, three test documents are printed based on the instruction. In a case where correction data is generated, the test documents are output using different dither patterns generated by the image processing unit 111. As this technique is publicly known, detailed description thereof is omitted. Further, a color/shape patch pattern from which each test document can be distinguished can be printed on a margin portion so that which dither pattern is used in outputting the read test document can be determined. Further, a number that specifies a document number can be printed on a margin so that the user can distinguish each test document with ease.

In step S404, an area for a variable number N is reserved on the RAM 104, and the variable number N is initialized to zero. Further, an area for a used flag for each test document for identifying a used test document for generating correction data is reserved, and the used flag is initialized to a value that indicates an unused state.

In step S405, a screen is displayed on the operation unit 114 to prompt the user to set the test documents output in step S403 at a desired document placement position on the platen glass 213 or the document tray 201 of the ADF. The user having seen the displayed screen sets the printed test documents at a desired document placement position.

In step S406, an instruction to start reading the test document is received via the operation unit 114.

In step S407, the CPU 103 transmits an inquiry about document detection information, which indicates whether a document is detected on the document tray 201 of the ADF and/or the platen glass 213, to the CPU 301 via the IO control unit A 109. The inquiry about document detection information does not have to be at this timing. For example, document detection information about the platen glass 213 can be acquired when the test document is set on the platen glass 213 and the document pressing plate 214 of the platen glass 213 is closed after step S405. Alternatively, the order of steps S406 and S407 can be reversed, and in a case where no document is detected on the platen glass 213 and the document tray 201 of the ADF, a document reading start instruction is not received.

In step S408, an operation mode in subsequent steps is determined based on the document detection information acquired in step S407. Details of the determination will be described below with reference to FIG. 5. In a case where a document placed on the document tray 201 of the ADF is detected, correction data is generated in a first correction mode. In the first correction mode, a test document is read in a first reading mode (ADF reading mode). Specifically, a plurality of test documents placed on the document tray 201 of the ADF is read based on one reading instruction. Then, a plurality of pieces of correction data corresponding to the respective test documents is generated using density information acquired by reading the test documents. Specifically, generation of correction data is started after all the test documents are read. On the other hand, in a case where a document placed on the platen glass 213 is detected, correction data is generated in a second correction mode. In the second correction mode, a test document is read in a second reading mode (pressing-plate reading mode). Correction data corresponding to the test document is generated using density information acquired by reading the single test document placed on the platen glass 213. The series of processing is executed each time a single test document is read. Specifically, the test document reading processing and the correction data generation processing are repeatedly executed a plurality of times.

In a case where it is determined that an error has occurred (ERROR in step S408), the processing proceeds to step S409. In a case where it is determined that the ADF reading mode (first reading mode) is to be performed (ADF READING MODE in step S408), the processing proceeds to step S410. In a case where it is determined that the pressing-plate reading mode (second reading mode) is to be performed (PRESSING-PLATE READING MODE in step S408), the processing proceeds to step S415.

In step S409, a screen that prompts the user to place the test document again appropriately is displayed on the operation unit 114.

In step S410, the test documents placed on the document tray 201 of the ADF are sequentially conveyed, a scanner controller reads the test documents, and images acquired by reading the test documents are transferred to the control unit 115. Then, the CPU 103 analyzes whether the transferred images are suitable for use in generation of correction data. For example, in a case where a luminance pattern is not detected from the images acquired by reading the test documents, a case where appropriate test documents are not used, and a case where the test documents are printed in an inappropriate state, the CPU 103 determines that the transferred images are not suitable for use in generation of correction data.

In step S411, in a case where it is determined that all the three images acquired by reading the three test documents can be used in generation of correction data in step S410 (YES in step S411), the processing proceeds to step S412. On the other hand, in a case where it is determined that one or more of the three images acquired by reading the three test documents cannot be used in generation of correction data (NO in step S411), the processing proceeds to step S413.

In step S412, the images acquired by reading the three test documents in step S410 are analyzed, and a correction table for use in correcting a density of an image to be printed is generated. Based on a difference between a value obtained by converting a luminance value of a read image to a density value and a target value stored on the RAM 104, a density correction table which is to be used in image processing a printed image and stored on the RAM 104 is generated (updated). As this technique is publicly known, detailed description thereof will be omitted.

In step S413, a screen that prompts the user to place the test document again appropriately is displayed on the operation unit 114.

In step S414, a screen that indicates that correction data is generated is displayed on the operation unit 114, and the processing of generating correction data for use in density adjustment is ended.

In step S415, the single test document placed on the platen glass 213 is read by the scanner controller, and an image acquired by reading the test document is transferred to the control unit 115. Then, the CPU 103 analyzes the transferred image. The image analysis is like that in step S410.

However, in a case where it is determined that the test document that has been previously used in generation of correction data is read again as a result of analyzing the patch for test document determination described above in the description of step S403 and comparing the patch with the used flag provided for each test document on the RAM 104, it is determined that the images cannot be used in generation of correction data. Alternatively, the patch for test document determination described above in the description of step S403 can be analyzed, and in a case where the test documents are inappropriate test documents, it may be determined that an error has occurred. For example, in a case where N=0, it is determined that the test document is for use in generation of correction data for a first dither pattern. In a case where N=1, it is determined that the test document is for use in generation of correction data for a second dither pattern. In a case where N=2, it is determined that the test document is for use in generation of correction data for a third dither pattern.

In step S416, if it is determined that the read image can be used in generation of correction data in step S415 (YES in step S416), the processing proceeds to step S417. If it is determined that the read image cannot be used in correction (NO in step S416), the processing proceeds to step S422.

In step S417, the image acquired in step S415 is analyzed, and a correction table for use in correcting a density of an image to be printed is generated. Based on a value obtained by converting a luminance value of a read image to a density value and a target value stored on the RAM 104, a density correction table to be used in image processing on a printed image and stored on the RAM 104 is generated (updated). Further, a flag for the test document that is used in generation of correction data among the used flags provided for each test document on the RAM 104 is set to a used state. As this technique is publicly known, detailed description thereof is omitted.

In step S418, one is added to the variable number N stored on the RAM 104.

In step S419, in a case where the variable number N is three or greater, it is determined that correction data has been generated using the three test documents (YES in step S419), and the processing proceeds to step S414. Otherwise (NO in step S419), the processing proceeds to step S420.

In step S420, a screen that prompts the user to set the Nth document on the platen glass 213 is displayed on the operation unit 114.

In step S421, an instruction to start reading the test document is received via the operation unit 114.

In step S422, a screen that prompts the user to place the test document again appropriately is displayed on the operation unit 114.

In step S423, in a case where the variable number N is one, the processing proceeds to step S405 so that the test document is removed from the platen glass 213 and placed on the ADF. In a case where the variable number N is two or greater, the processing proceeds to step S420 so that the generation of correction data by reading from the platen glass 213 is continued. Further, the determination in step S423 can be skipped. In this case, the processing proceeds from step S422 to step S420.

Alternatively, the processing of generating correction data for use in density adjustment that is executed in the flowchart can be cancelled based on an instruction to the operation unit 114 in steps S405 and S420.

Next, a method for the operation mode determination in step S408 will be described below with reference to FIG. 5.

FIG. 5 is a table that illustrates a process of determining an operation in step S408 based on information that indicates whether a document is detected on the platen glass 213 and/or the document tray 201 of the ADF. In a case where a document is detected on the platen glass 213 and no document is detected on the document tray 201 of the ADF, the processing proceeds from step S408 to step S410. Specifically, the test document is read in the pressing-plate reading mode, and correction data is generated in the second correction mode. On the other hand, in a case where no document is detected on the platen glass 213 and a document is detected on the document tray 201 of the ADF, the processing proceeds from step S408 to step S411. Specifically, the test document is read in the ADF reading mode, and correction data is generated in the first correction mode.

In a case where a document is detected on the platen glass 213 and on the document tray 201 of the ADF, or in a case where no document is detected on the platen glass 213 and on the document tray 201 of the ADF, it is determined that an error has occurred, and the processing proceeds from step S408 to step S409.

Alternatively, in the case where a document is detected on the platen glass 213 and on the document tray 201 of the ADF, the operation unit 114 displays a screen that prompts the user to select whether a test document is to be read via the platen glass 213 or the ADF (the first reading mode or the second reading mode). Then, the test document is read in the user-selected mode. Further, in another exemplary embodiment, in the case where a test document is detected on the platen glass 213 and on the document tray 201 of the ADF, reading can be executed from predetermined one of the platen glass 213 and the document tray 201 of the ADF. For example, reading from the ADF is prioritized as in a copy function, or reading from one of the platen glass 213 and the document tray 201 of the ADF that is preset on the operation unit 114 is prioritized.

Next, an example of a screen that is displayed on the operation unit 114 will be described below with reference to FIGS. 6A to 6D.

Figure 6A:
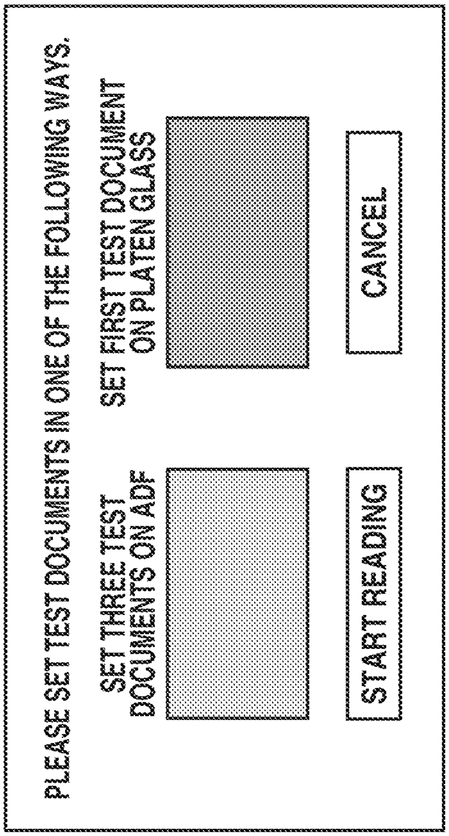
FIGS. 6A, 6B, 6C, and 6D illustrate an example of a screen display according to the first exemplary embodiment of the present disclosure.

FIG. 6A illustrates an example of a screen that is displayed in steps S405 and S406. The screen prompts the user to set three test documents on the document tray 201 of the ADF or set the first test document on the platen glass 213. Although not illustrated in FIG. 6A, an item for designating a test document placement method (orientation, front/back) and the number of test documents can be displayed on the screen. At the press of a "START READING" button, step S406 is executed.

Figure 6B:
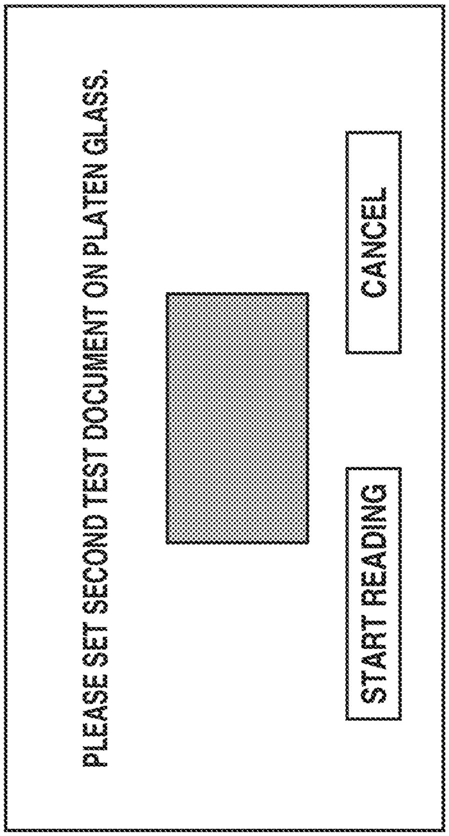

FIG. 6B illustrates an example of a screen that is displayed in steps S420 and S421. The screen prompts the user to set a test document to be read next on the platen glass 213. The example is a case where N=2, and the displayed phrase is changed depending on the number of test documents to be set based on the value of N. At the press of the "START READING" button, step S421 is executed. In a case where a "CANCEL" button is pressed on the screen, the processing of generating correction data for use in density adjustment is ended.

Figure 6C:
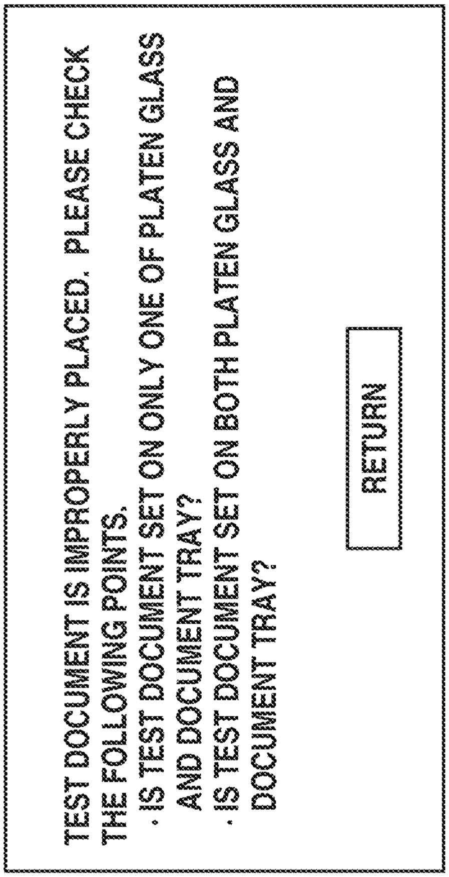

FIG. 6C illustrates an example of a screen that is displayed in step S409. The screen prompts the user to check the test document placement method in order to resolve an error due to a test document detection state illustrated in FIG. 5. At the press of a "RETURN" button, the processing proceeds to step S405.

Figure 6D:
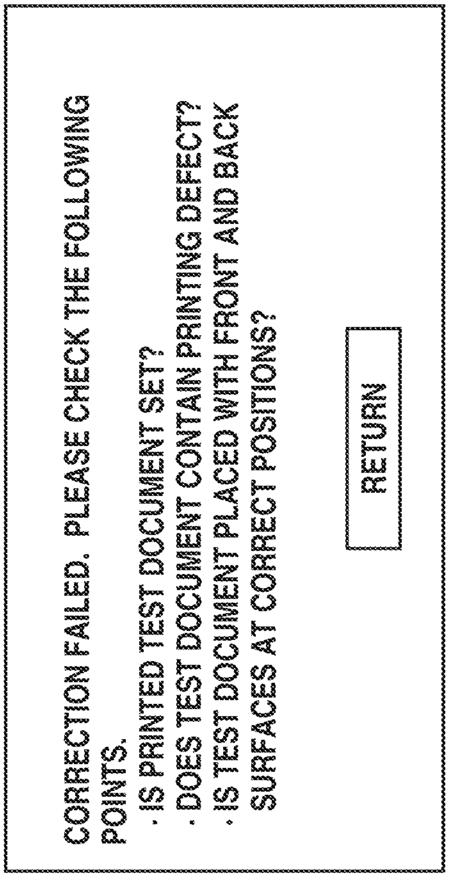

FIG. 6D illustrates an example of a screen that is displayed in steps S413 and S422. Since the read image is not suitable for use in generation of correction data, an item for checking whether the read document is a test document and an item for checking whether the print state of a test document with no defects are displayed to prompt the user to check the items. At the press of the "RETURN" button, the processing proceeds to step S405 or S423.

As described above, a test document reading method is determined based on document detection results acquired from the platen glass 213 and the document tray 201 of the ADF, and a process of generating density correction data is determined. Thus, calibration is performed by an appropriate process using a test document placed at a desired position by the user.

Further, when the user places a test document at a desired placement position on the platen glass 213 or the document tray 201 of the ADF, an appropriate process for generating correction data is automatically determined, so that the bother of inputting a setting in advance by the user can be omitted.

In the first exemplary embodiment, an example in which a process of generating density correction data is determined based on the area where a placed test document is detected, i.e., based on the test document reading mode, is described.

In a second exemplary embodiment, a configuration that the reading mode can be changed during correction data generation will be described below. This increases the freedom and flexibility of test document reading, so that an image forming apparatus the calibration function of which can be used as desired by the user can be provided.

Points that are described in the first exemplary embodiment with reference to FIGS. 1, 2, and 3 are like those in the second exemplary embodiment, so that description thereof will be omitted.

Figure 7:
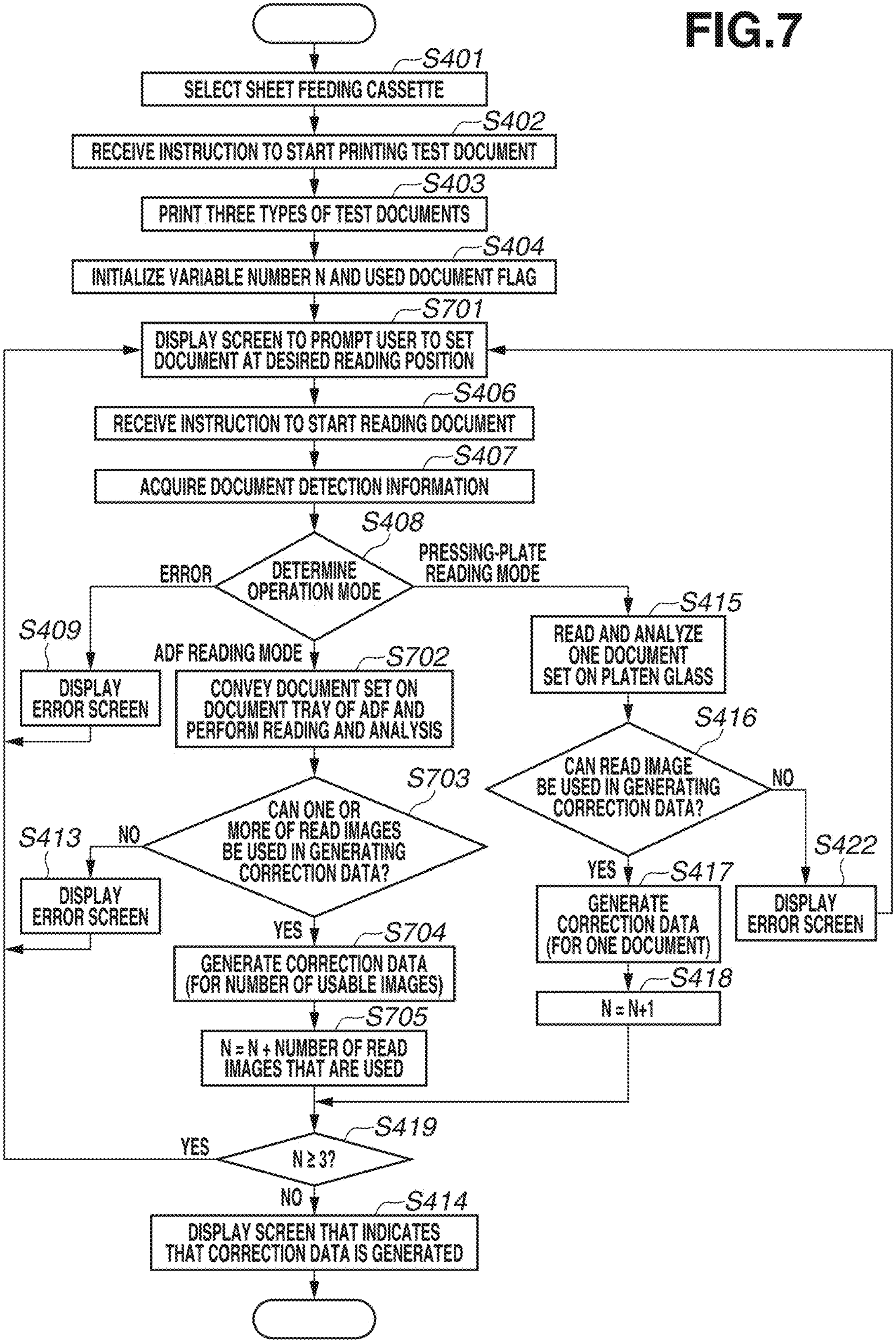
FIG. 7 is a flowchart illustrating an operation according to a second exemplary embodiment of the present disclosure.

A process of generating correction data for use in density adjustment according to the present exemplary embodiment will be described below with reference to FIG. 7. In this example, three test documents are printed and read and correction is performed. The number of test documents is not limited to three, and a required number of test documents for generation of desired correction data can be used. Description of points that are like those in FIG. 4 is omitted.

Figure 8A:
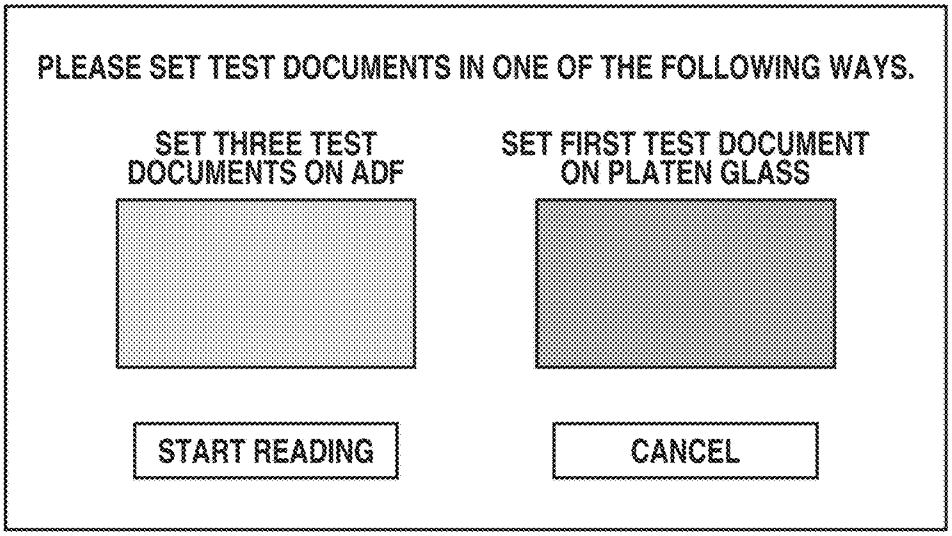
FIGS. 8A, 8B, and 8C illustrate an example of a screen display according to the second exemplary embodiment of the present disclosure.
Figure 8B:
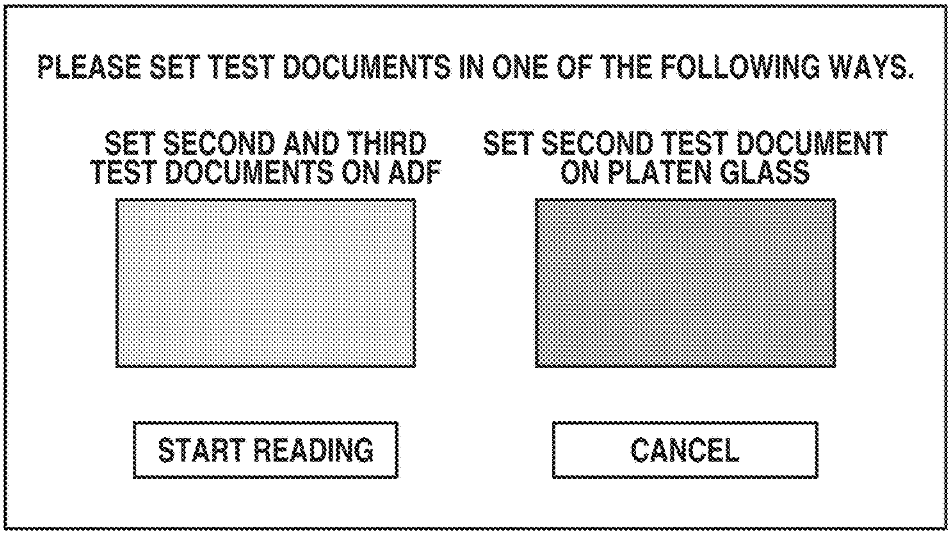
Figure 8C:
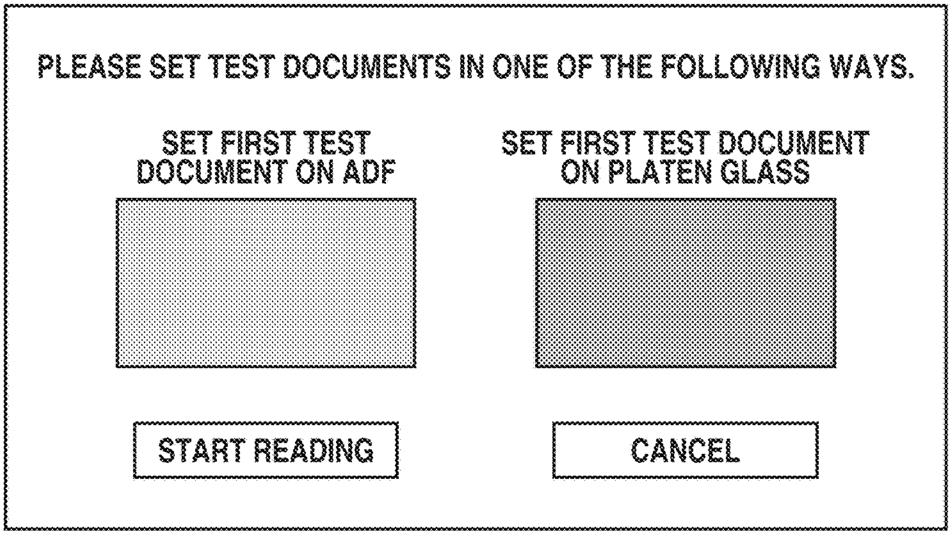

In step S701, a screen that prompts the user to set the test documents output in step S403 at a desired reading portion is displayed on the operation unit 114. A correction-data-generated flag is referred to. Details thereof are illustrated in FIGS. 8A, 8B, and 8C. Then, in a case where correction data is not successfully generated using each result of reading the test documents, if the first correction mode using the ADF reading mode is being executed, a screen is displayed to prompt the user to set the three test documents on the document tray 201 of the ADF. On the other hand, if the second correction mode using the pressing-plate reading mode is being executed, a screen is displayed to prompt the user to set the first test document on the platen glass 213.

Further, in a case where the processing returns to step S701 after correction data is successfully generated using at least one of the test documents in either one of the reading modes, an instruction is changed as described below.

If the first correction data mode using the ADF reading mode is being executed, an instruction to set a (single or plurality of) test document(s) that has not been used in generation of correction data on the document tray 201 of the ADF is provided.

On the other hand, if the second correction data mode using the pressing-plate reading mode is being executed, an instruction to set one of the other test documents that have not been read for generation of correction data on the platen glass 213 is provided.

In step S702, the test documents are conveyed in the order in which the test documents are placed on the document tray 201 of the ADF, the conveyed test documents are read by the scanner controller, and images acquired by reading the test documents are transferred to the control unit 115. Then, the CPU 103 analyzes whether the transferred images are suitable for use in generation of correction data. For example, in a case where a luminance pattern is not detected from the images acquired by reading the test documents, a case where appropriate test documents are not used, and a case where the test documents are printed in an inappropriate state, the CPU 103 determines that the transferred images are not suitable for use in generation of correction data. Further, the CPU 103 refers to a document detection flag, and if a test document is previously used to generate correction data, the CPU 103 determines that the used test document is not suitable for use as an image for generation of correction data.

In step S703, if the CPU 103 determines that one or more of the test documents read in step S702 can be used in generation of correction data (YES in step S703), the processing proceeds to step S704. Otherwise (NO in step S703), the processing proceeds to step S413. In another exemplary embodiment, if the CPU 103 determines that all the test documents read in step S702 can be used in generation of correction data, the processing proceeds to step S703. Otherwise, the processing proceeds to step S413.

In step S704, the CPU 103 analyzes each image determined as an image that can be used in generation of correction data among the images of the test documents read in step S702, and executes correction data generation processing. Details of the correction data generation processing are like those in step S412, so that description thereof will be omitted.

In step S705, the number of test documents on which correction has been performed is added to the variable number N stored on the RAM 104.

Next, an example of a screen that is displayed on the operation unit 114 will be described below with reference to FIGS. 8A, 8B, and 8C. A screen like that described above with reference to FIGS. 6A to 6D is displayed in a case of an error, so description thereof will be omitted.

FIG. 8A illustrates an example of a screen that is displayed in steps S406 and S407 in a case where correction data has not been successfully generated. A screen that prompts the user to set the three test documents on the document tray 201 of the ADF or the first test document on the platen glass 213 is displayed. Although not illustrated in FIG. 8A, an item for designating a test document placement method and the number of test documents can be displayed. At the press of the "START READING" button, step S407 is executed.

FIG. 8B illustrates an example of a screen that is displayed in steps S406 and S407 in a case where the first test document is read via the platen glass 213 and correction data is successfully generated. The correction-data-generated flag is referred to, and since the first test document for which corresponding correction data has been successfully generated is unnecessary, the screen prompts the user to place the second and third test documents on the document tray 201 of the ADF. This point is a difference from FIG. 8A. In an alternative configuration, the screen can always prompt the user to place the three test documents on the document tray 201 of the ADF. In this case, as described above in the description of step S702, the test document for which correction data is successfully generated is not a correction target, so that no issue arises.

FIG. 8C illustrates an example of a screen that is displayed in steps S406 and S407 in a case where the second and third test documents are read via the ADF and correction data is successfully generated. The correction-data-generated flag is referred to, and the screen prompts the user to set the first test document for which correction data has not yet been successfully generated on the document tray 201 of the ADF or the platen glass 213.

In the second exemplary embodiment, the screen prompts the user to set the three test documents on the document tray 201 of the ADF, as in the first exemplary embodiment. However, for example, in a case where the user intends to set all the three test documents on the document tray 201 of the ADF but sets only two of the test documents, the two test documents are read in the ADF reading mode and correction data is generated in the first correction mode in the present exemplary embodiment. Then, the remaining single test document is separately read in the pressing-plate reading mode and correction data is generated in the second correction mode. (It is also possible to read the test document in the ADF reading mode and generate correction data in the first correction mode).

Further, the user who needs highly-accurate correction data only for a specific dither pattern and wishes to efficiently generate correction data for the remaining dither patterns can use the two correction modes in generating correction data. Specifically, the test document that corresponds to correction data corresponding to the specific dither pattern is set on the platen glass 213 and is read in the pressing-plate reading mode. In this way, the test document is read with great accuracy, so that highly-accurate correction data is generated.

Further, the test documents that correspond to correction data corresponding to the remaining dither patterns are set on the document tray 201 of the ADF and read in the ADF reading mode. In this way, the test documents are efficiently read, so that the burden on the user that is involved in generation of correction data is reduced.

According to the exemplary embodiments of the present disclosure, when the user places a chart that is a document with a test pattern printed thereon at a desired document placement position, a correction mode in which calibration is to be executed is automatically determined based on the placement position. In this way, calibration is executed by a process in the mode that is automatically determined based on the document placement position.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:

a printer configured to print an image on a sheet;

a reader including:

a platen on which a document is to be placed;

a reading sensor configured to read an image of the document placed on the platen; and a stacking tray on which a document is to be stacked;

a conveyance roller configured to convey the document stacked on the stacking tray to cause the reading sensor to read an image of the document stacked on the stacking tray;

a discharge tray on which the document conveyed by the conveyance roller is discharged;

a sheet detector configured to detect the document on the stacking tray; and a controller configured to:

control the printer to print a test chart on a sheet;

receive user instruction information for instructing the reader to read the sheet on which the test chart is printed;

control the reader to read the test chart printed on the sheet placed on the platen in a case where the user instruction information is received in a state where the sheet on which the test chart is printed is placed on the platen;

control the reader to read the test chart printed on the sheet by the conveyance roller conveying the sheet stacked on the stacking tray in a case where the user instruction information is received in a state where the sheet on which the test chart is printed is stacked on the stacking tray; and execute calibration of the printer based on a reading result of the test chart read by the reader.

2. The image forming apparatus according to claim 1, wherein the controller controls the reader to read the test chart printed on the sheet placed on the platen in a case where the user instruction information is received in a state where the sheet on which the test chart is printed is not stacked on the stacking tray but the sheet on which the test chart is printed is placed on the platen, and wherein the controller controls the reader to read the test chart printed on the sheet by the conveyance roller conveying the sheet stacked on the stacking tray in a case where the user instruction information is received in a state where the sheet on which the test chart is printed is not placed on the platen but the sheet on which the test chart is printed is stacked on the stacking tray.

3. The image forming apparatus according to claim 1, wherein the calibration is control to adjust density of an image to be printed by the printer.

4. The image forming apparatus according to claim 1, wherein the printer prints the image based on correction data, and wherein the calibration is control to generate the correction data based on the reading result of the test chart read by the reader.

5. The image forming apparatus according to claim 1, wherein the controller determines whether a sheet is placed on the platen by using the reading sensor in a case where the user instruction information is received.

6. The image forming apparatus according to claim 5, wherein the controller controls the reader to read the test chart printed on the sheet placed on the platen in a case where a determination result indicates that a sheet is placed on the platen.

7. The image forming apparatus according to claim 1, further comprising a detector configured to detect a sheet stacked on the stacking tray.

8. The image forming apparatus according to claim 7, wherein the controller controls the reader to read the test chart printed on the sheet by the conveyance roller conveying the sheet stacked on the stacking tray in a case where a detection result of the detector indicates that the sheet is stacked on the stacking tray.

9. The image forming apparatus according to claim 1, wherein the controller does not control the reader to read the test chart in a case where a sheet is placed on the platen and a sheet is stacked in the stacking tray.

10. The image forming apparatus according to claim 1, wherein the controller does not execute the calibration in a case where a sheet is placed on the platen and a sheet is stacked in the stacking tray.

11. The image forming apparatus according to claim 4, wherein the correction data is not generated in a case where a sheet is placed on the platen and a sheet is stacked in the stacking tray.

12. The image forming apparatus according to claim 1, further comprising a display used for notifying abnormality, wherein the display displays abnormality in a case where a sheet is placed on the platen and a sheet is stacked in the stacking tray.

* * * * *